United States Patent
Yu (10) Patent No.: US 10,118,859 B2
(45) Date of Patent: Nov. 6, 2018

(54) LOW WATER CONTENT PLASTIC COMPOSITION COMPRISING HYDRAULIC CEMENT AND METHOD FOR MANUFACTURING SAME

(71) Applicant: IDIN CO., LTD., Daegu (KR)

(72) Inventor: Ji-Su Yu, Daegu (KR)

(73) Assignee: IDIN CO., LTD., Daegu (KR)

( * ) Notice: Subject to any disclaimer, the term of this patent is extended or adjusted under 35 U.S.C. 154(b) by 0 days.

(21) Appl. No.: 15/326,209

(22) PCT Filed: Jul. 20, 2015

(86) PCT No.: PCT/KR2015/007494
§ 371 (c)(1),
(2) Date: Jan. 13, 2017

(87) PCT Pub. No.: WO2016/013823
PCT Pub. Date: Jan. 28, 2016

(65) Prior Publication Data
US 2017/0197880 A1   Jul. 13, 2017

(30) Foreign Application Priority Data

Jul. 25, 2014 (KR) .................. 10-2014-0094774

(51) Int. Cl.
| | |
|---|---|
| *C04B 26/16* | (2006.01) |
| *C04B 28/04* | (2006.01) |
| *C04B 28/02* | (2006.01) |
| *C04B 28/08* | (2006.01) |
| *C04B 38/10* | (2006.01) |
| C04B 111/40 | (2006.01) |

(52) U.S. Cl.
CPC .............. *C04B 26/16* (2013.01); *C04B 28/02* (2013.01); *C04B 28/04* (2013.01); *C04B 28/082* (2013.01); *C04B 38/10* (2013.01); *C04B 38/103* (2013.01); *C04B 2111/40* (2013.01); *C04B 2201/50* (2013.01)

(58) Field of Classification Search
CPC ......... C04B 26/16; C04B 28/02; C04B 28/04; C04B 28/082; C04B 38/10; C04B 2111/40; C04B 2201/50
See application file for complete search history.

(56) References Cited

U.S. PATENT DOCUMENTS 3,354,099 A * 11/1967 Stegeman ............. C04B 24/282
                                                           264/122
3,951,674 A    4/1976 Currey et al.
4,211,680 A    7/1980 Shearing et al.
4,880,467 A   11/1989 Rirsch

FOREIGN PATENT DOCUMENTS

| GB | 2353993 A | 3/2001 |
|---|---|---|
| JP | P2006-240919 A | 9/2006 |
| JP | P2009-203124 A | 9/2009 |
| JP | P2009-274911 A | 11/2009 |
| JP | P2010-58997 A | 3/2010 |
| KR | 10-0892247 B1 | 4/2009 |
| KR | 10-1075260 B1 | 8/2010 |
| KR | 10-1135593 B1 | 4/2012 |

OTHER PUBLICATIONS

L. Verdolotti et al. Polyurethane-Cement-Based Foams: Characterization and Potential Uses, Journal of Applied Polymer Science. , Sep. 11, 2007, pp. 1-8, vol. 107(1-8).
Communications of Office Action dated Feb. 5, 2018 of European Patent Application No. 15824493.9, which corresponds to this application.

* cited by examiner

*Primary Examiner* — John M Cooney (74) *Attorney, Agent, or Firm* — Goldilocks Zone IP Law (57) ABSTRACT

The present invention relates to a low water content plastic composition comprising hydraulic cement and a method for manufacturing the same. The present invention provides a low water content plastic composition comprising hydraulic cement and a method for manufacturing the same, the composition being characterized by losing flowability and having plasticity since from a flowable, uniform mixture state of hydraulic cement and water with polyol and isocyanate compounds which are raw materials for forming foamed polyurethane, part of the water used in the mixture is separated and removed due to foaming in the course of formation of the foamed polyurethane.

3 Claims, 3 Drawing Sheets

LOW WATER CONTENT PLASTIC COMPOSITION COMPRISING HYDRAULIC CEMENT AND METHOD FOR MANUFACTURING SAME

CROSS REFERENCE TO RELATED PATENT APPLICATIONS

This application claims the benefit under 35 U.S.C. Section 371, of PCT International Application No. PCT/KR2015/007494, filed Jun. 20, 2015, which claimed priority to Korean Patent Application No. 10-2014-0094774 filed Jul. 25, 2014, the disclosures of which are hereby incorporated by the references.

TECHNICAL FIELD

The present invention relates to a plastic composition with a low water content containing hydraulic cement and a method for manufacturing the same, and more particularly, to a plastic composition with low water content which is obtained by removing water from flowable cement paste prepared by mixing hydraulic cement with water using foaming strength in the process of forming foamable polyurethane and a method for manufacturing the same.

BACKGROUND ART

The term "cement", which come from the Latin meaning "crushed stone", refers to a material of binding one substance to another substance.

Hydraulic cement means cement of forming a waterproofing product, a representative example thereof is Portland cement which is produced by grinding clinker, which is obtained by mixing limestone with clay at a proper mixing ratio and then heating the mixture to a temperature of 1,450° C. to 1,550° C. using a rotary kiln, with about 5 wt % of gypsum (calcium sulfate) to a size of 75 µm or less using a ball mill to control hydraulic setting reactions, and examples thereof include blast furnace slag cement containing 30 wt % to 40 wt % of a blast furnace slag with Portland cement, pozzolan cement containing 20 to 25 wt % pozzolan with Portland cement, expansive cement containing an expandable additive with Portland cement, quick-setting/rapid-hardening cements such as blends of calcium aluminate cement with Portland cement, and blends of Portland cement with plaster, or fine particle-type Portland cement, oil-well cement obtained by reducing the amount of aluminum oxide present in Portland cement and conducting rough crushing, white cement produced by reducing an iron content of Portland cement, modified cement such as colored cement produced by adding a pigment such as iron oxide, chromium oxide or cobalt blue to white cement and calcium aluminate cement used to produce cold weather concrete and refractories.

The hydraulic cement produces a waterproof hard cured substance, when mixed with water, to cause a chemical reaction producing hydrates. This process may be classified into (1) losing flowability in the physical view, (2) setting inducing solidification of a plastic cement paste and (3) curing.

Portland cement is utilized, as a starting material, in the form of a gray powder composed of coarse particles with a size of 1 µm to 50 µm and, when the gray powder is dispersed in water, hot products of calcium sulfate and calcium contained in the cement are readily dissolved to produce a variety of ions. First, these ions produce an acicular crystal, ettringite, and then calcium hydroxide prismatic crystals and thin acicular crystals of calcium silicate hydrate fill the spaces where the cement particles are dissolved in water. Accordingly, it is known that the cement paste losses flowability (1), is set and unstable ettringite is degraded into calcium alumina silicate hydrates taking the form of a stable hexagonal plate-type crystal again (2) and is then cured (3).

As such, a flowable cement paste can be produced by simply mixing hydraulic cement with water and can be utilized in a variety of applications including mortar obtained by adding sand to the flowable cement paste, concrete obtained by adding sand and aggregate to the flowable cement paste, grout obtained by adding fine aggregate thereto, shotcrete for spraying and the like, and then widely used in the form of composite materials in construction, civil engineering and art installations after curing.

Meanwhile, it is known that the cured cement paste contains a large number of pores having various sizes and irregular shapes (1) and crystal products produced by hydration of the hydraulic cement are also very irregular (2). In general, a cured substance produced using hydraulic cement has a low compressive strength of 7% to 11% in terms of tensile strength due to presence of pores and structural irregularity. However, temperature and humidity changes resulting from climate changes in natural environments frequently and repeatedly cause expansion and shrinkage depending on temperature, and expansion and shrinkage depending on water proportion changes. The cured cement paste has a major drawback in that it receives tensile strength when shrinkage is induced, and thus cracks and is readily deteriorated. The low tensile strength of the cured hydraulic cement is a major obstacle limiting the application scope of cement.

Factors such as air entrainment, curing period and conditions and size of molded materials affect formation of the pores in the cured cement, but it is known that the amount of water added in the process of producing cement paste is most closely related to formation of the pores in the cured cement, and cured cement paste produced using a large amount of water has a higher pore content and much lower strength than a cured cement paste produced using a smaller amount of water.

Active research and development to solve these drawbacks of the hydraulic cement has been underway and many technologies related thereto have been published. The research and development may be broadly classified into: (1) adding fibrous reinforcement materials such as asbestos, glass fiber, metal fiber, ceramic fiber, natural fiber and synthetic fiber; (2) producing cement paste containing a small amount of water and applying mechanical compression or vibration for firming prior to curing; (3) developing an admixture for controlling surface activity of cement particles, and setting and applying the same; and (4) adding liquid or granular plastic additives.

Recently, addition of liquid or granular plastic additives to cement paste has received attention as a method of fundamentally solving drawbacks of water-curable cured cement because it improves flowability of hydraulic cement, thereby reducing use of mixed water and the cured cement contains plastic additives uniformly present therein, thereby improving adhesion between two cured cements, or between an aggregate and cured cement.

For example, U.S. Pat. No. 3,951,674 points out that cements need excess water to improve workability and this causes a deterioration in strength of the cured cement, and suggests addition of 0.3 wt % to 2 wt % of water-soluble cellulose acetate sulfate, as an alternative therefor, with respect to the weight of Portland cement so as to delay curing time of cement paste (1) and reduce friction between cement and aggregated particles, thereby improving workability with a small amount of water and obtaining a cured substance with excellent strength (2).

In addition, U.S. Pat. No. 4,880,467 argues that cured cement should have a flexural strength of 15 MPa or more, preferably 40 MPa or more, so that the cured cement has sufficient durability to withstand outer environmental changes and discloses that this can be accomplished by, as an uncured cement particle paste containing particles with a size of less than 100 μm, a cement paste which contains one or more hydraulic cements and 1 to 20 parts by weight of a synthetic resin selected from a styrene-butadiene copolymer, an acrylester polymer, a vinyl acetate polymer, a vinylidene chloride polymer, an epoxy resin, a phenol resin, a urethane resin and an acrylic resin, with respect to 100 parts by weight of hydraulic cement, and further contains 8 to 20 parts by weight of water with respect to 100 parts by weight of the hydraulic cement.

As such, there are a variety of plastics applicable upon addition of the liquid or granular plastic additive to the cement paste and technologies for applying a number of types of plastic materials to cement have been suggested to date. However, in order for plastic additives to be mixed to cement paste to reduce voids of cured cement, offer an additional adhesive force between particles and improve tensile strength of cured substance, first of all, affinity between the plastic additive and cured cement should be considered.

Polyurethane, which is a plastic having a urethane bond, is produced by reaction of an isocyanate compound with polyol, and research is widely underway to apply polyurethane to cured cement because the cured cement has strength, abrasion resistance, oil resistance and elasticity, in particular, strong adhesion strength with cured cement.

For example, Korean Patent No. 0892247 discloses a polyurethane-based cement composition which is prepared by mixing 50 to 1,000 parts by weight of dry mortar with 100 parts by weight of a resin mixture consisting of a main ingredient and a curing agent in a ratio of 1:1 and is applicable as a waterproof coating material, a coating material or a substrate controller when applied to a substrate such as asphalt or concrete.

In addition, Korean Patent No. 1135593 discloses a composite with excellent sound-proofing property and heat insulation which is prepared by mixing 50 to 70 parts by weight of a cement powder with 10 to 30 parts by weight of a powder additive to prepare a cement mixture powder, mixing a mixture of isocyanate, polyol and a foaming agent with the cement mixture powder prepared above and then conducting foaming under pressure.

In another example, Korean Patent No. 1075260 discloses a urethane resin mortar composition for ground paving which is prepared by mixing 150 to 200 parts by weight of cement, 25 to 75 parts by weight of an inorganic pigment, 25 to 75 parts by weight of an anti-sedimentation agent and 25 to 75 parts by weight of a self-leveling agent, with respect to 100 parts by weight of a liquid acrylic urethane resin.

However, all of these patents relate to technologies associate with combination of substances such as cement and urethane, or cement, urethane, water and the like, or use of a new application or processing method, suggest only a method for manufacturing a mix composition obtained in the form of a uniform liquid, or a method of applying a liquid composition obtained in the form of a uniform liquid, and do not teach technologies which include discharging and separating free water present between cement particles via a process of foaming polyurethane in a cement paste, although sufficient blended water to uniformly hydrate cement particles is added, to provide a flowable mixture composition of polyurethane and cement paste, containing a very small amount of water.

DISCLOSURE

Technical Problem

Therefore, the present invention has been made to solve problems of conventional hydraulic cements and technologies to improve the cements, and it is an object of the present invention to provide a low water content plastic composition comprising hydraulic cement that can effectively solve the problem of deterioration in physical properties of hydraulic cured cement which is induced by water added so as to obtain a hydrated cured substance of hydraulic cement by separating water blended with the water-soluble cement, thus obtaining a cured substance with excellent durability, and a method for manufacturing the same.

Technical Solution

In accordance with one aspect of the present invention, the above and other objects can be accomplished by the provision of a low water content plastic composition comprising hydraulic cement, wherein the plastic composition is obtained by mixing hydraulic cement, water, and polyol and isocyanate compound as ingredients for forming foamable polyurethane to prepare a flowable homogenous mixture and foaming polyurethane in the presence of the flowable homogenous mixture in a process of forming foamable polyurethane to partially separate and remove the water used for the mixture so that the plastic composition loses flowability and has plasticity.

Preferably, the homogeneous mixture may include 2.5 parts by weight to 150 parts by weight of water and 10 parts by weight to 100 parts by weight of the ingredients for forming foamable polyurethane with respect to 100 parts by weight of the hydraulic cement.

In accordance with another aspect of the present invention, provided is a method for manufacturing a plastic composition with a low water content containing hydraulic cement including mixing hydraulic cement, water, and polyol and an isocyanate compound, as ingredients for forming foamable polyurethane to obtain a flowable homogeneous mixture, polymerizing and foaming polyurethane in the presence of the flowable homogeneous mixture to discharge free water present between cement particles based on foaming force and thereby phase-separate liquid water from a plastic composition containing foamable polyurethane and hydraulic cement and losing flowability, and removing the phase-separated water.

Effects of the Invention

The present invention may have the following effects.

First, the present invention provides a plastic composition containing uniformly wet cement particles and polyurethane in spite of containing a very small amount of water.

Second, water mixed with cement causing deterioration in adhesive strength of polyurethane is effectively removed in the process of preparing the mix composition to offer excellent adhesive strength. Accordingly, the plastic composition can be easily applied to reinforcement materials such as metal mesh, glass wool, glass wool mesh, synthetic fiber and synthetic fiber fabric, may produce a hard composite when mixed with particles such as pulp, wood fiber and dry sand, and can be widely used as coating agents, adhesives for laminating and core materials with a variety of materials requiring high adhesive properties.

Third, the present invention provides a composition that exhibits substantially urethane surface properties while containing a relatively small amount of urethane, thus exhibiting higher economic efficiency than general petrochemical adhesives and reducing use of chemical substances which are actively reputed on harmfulness.

Fourth, based on rapid curing of polyurethane, the composition is applied to industrial sites using hydraulic cement, thus improving production efficiency.

Fifth, high abrasion resistance and excellent rigidity induced by the forming of homogeneously hydrated cured substance of hydraulic cement containing homogeneously added water and the dense structure properties between polyurethane and cured cement of the cured substance is provided.

Sixth, since polyurethane stably traps hydraulic cement particles, a cured substance with excellent abrasion resistance and rigidity can be formed without loss of hydraulic cement both in water and in oil.

The plastic composition with a low water content containing hydraulic cement according to the present invention having the aforementioned properties can be used as a durable structural material, a composite structural material, a surface material for laminating, a core material, a coating agent and an adhesive agent.

DESCRIPTION OF DRAWINGS

The above and other objects, features and other advantages of the present invention will be more clearly understood from the following detailed description taken in conjunction with the accompanying drawings, in which.

BEST MODE

The plastic composition with a low water content prepared using polyurethane and cement is obtained by mixing hydraulic cement based on Portland cement, water and, liquid polyol and an isocyanate compound for forming foamable polyurethane to obtain a flowable homogeneous mixture, stirring the mixture for a certain time and separating discharged free water therefrom.

More specifically, the present invention utilizes a flowable cement paste prepared by homogenously mixing four ingredients, that is, hydraulic cement, water, the liquid isocyanate compound and polyol for forming foamable urethane so that conditions to allow cement particles to be uniformly hydrated are provided (1), wet cement particles are trapped in polyurethane during formation and foaming of polyurethane (2), and free water present between cement particles is selectively separated while discharging carbon dioxide produced by reaction of the isocyanates with water (3).

As a result, provided is a cured substance that exhibits excellent adhesive strength of polyurethane, which is uniformly mixed with the cement paste and present, throughout the mixture cement paste until polyurethane is completely polymerized and cured, that exhibits plasticity enabling deformation into a desired shape until the mixed cement is hydrated and set, and that exhibits high hardness caused by cured cement with ideal uniformity and high abrasion resistance and excellent rigidity caused by dense structural properties between hydrated cement and urethane, when the mixed cement has been completely hydrated and cured.

Liquid polyester, polyether or castor oil that includes two or more hydroxyl groups (—OH) in a molecular structure thereof may be used as the polyol for forming foamable polyurethane used in the present invention, halogenated polyol may be useful so as to reinforce flame retardancy, and an amine-based catalyst may be mixed in an amount of 0.5 wt % to 5 wt % with respect to the weight of polyol to improve a reaction rate with the isocyanate compound.

In addition, an isocyanate compound having two or more isocyanate groups (—N=C=O) in a molecular structure may be useful as the isocyanate compound used in the present invention and the isocyanate compound is preferably less toxic and less volatile liquid polymeric MDI.

The hydraulic cement used in the present invention may be arbitrarily selected from Portland cement; blast furnace slag cement, pozzolan cement and expansive cement based on Portland cement; quick-setting/rapid-hardening cement containing Portland cement and calcium aluminate cement; oil-well cement, white cement, colored cement containing a pigment, cold weather concrete and calcium aluminate cement. In order to selectively separate free water present in cement particles and obtain a uniform cured substance, first, granular hydraulic cement should be uniformly mixed with water and polyol. For this purpose, water may be added alone to the hydraulic cement and polyol may then be further added, or a combination of polyol and water may be added and then mixed, or polyol may be first added and water may then be added. In order to prevent production of un-hydrated cement particles, after addition of water to hydraulic cement, stirring for at least 30 seconds is needed.

Meanwhile, water may be added in an amount of 2.5 parts by weight to 150 parts by weight with respect to 100 parts by weight of the hydraulic cement. When the amount of added water is excessively low, workability associated with stirring, transfer and the like may be deteriorated due to high viscosity of the mixture, and when the amount of added water is excessively high, cement particles may be lost in the process of aggregating the mixture and aggregation of polyurethane may be deteriorated. Thus, water is preferably added in an amount of 5 parts by weight to 65 parts by weight with respect to 100 parts by weight of the hydraulic cement.

According to the present invention, an isocyanate compound is added to a homogenous mixture of hydraulic cement, water and polyol. The isocyanate compound and previously mixed polyol are the ingredients for forming foamable urethane, which form urethane bonds in the mixture and grow into macromolecules to trap hydraulic cement particles and exhibit adhesive strength. In addition, after the hydraulic cement is cured, polyurethane improve abrasion resistance and rigidity of the cured cement. Thus polyol and the isocyanate compound may be added in an amount of 10 parts by weight to 100 parts by weight, with respect to 100 parts by weight of the hydraulic cement. In this case, when the amount of added ingredients for forming urethane is excessively low, trap of cement particles is not smooth due to low aggregation and when the amount of added ingredients for forming urethane is excessively high, as compared to the amount of added cement, free water present therein is not smoothly discharged due to improved flexibility and air-tightness of the mixture.

Meanwhile, the added isocyanate compound should function to produce carbon dioxide by reaction with water, in addition to reaction of polyol. Accordingly, according to the present invention, it is important to control a weight ratio between polyol and isocyanate within the range of 2:7 to 7:5.

8 g of liquid polymeric MDI was added, rapid stirring was conducted for 10 seconds and then slow stirring was conducted for 1 minute. Then, the discharged water was transferred to another container and weighed, the plastic composition was molded in the form of film using a roller and cured for 24 hours. Then, properties of the plastic composition and the cured substance were observed and are shown in the following Table 1.

TABLE 1

| Items | | Ex. 1 | Ex. 2 | Ex. 3 | Ex. 4 | Ex. 5 |
|---|---|---|---|---|---|---|
| Hydraulic cement | Portland cement | 40 g | | | | |
| | Plaster | | 40 g | | | |
| | White cement | | | 40 g | | |
| | Blast furnace slag cement | | | | 40 g | |
| | Quick-setting cement | | | | | 40 g |
| Water | | 16 g | 16 g | 16 g | 16 g | 16 g |
| Polyether polyol | | 8 g | 8 g | 8 g | 8 g | 8 g |
| MDI | | 8 g | 8 g | 8 g | 8 g | 8 g |
| Amount of discharged water | | 10.7 g | 0 g | 2.0 g | 5.5 g | 8.1 g |
| Properties of plastic composition | | Excellent adhesive property, excellent plasticity | Weak aggregation | Excellent plasticity | Excellent adhesive property, excellent plasticity | Excellent adhesive property, excellent plasticity |
| Properties of cured substance | | Excellent strength, excellent hardness | Low strength, low hardness | Low strength, excellent hardness | Medium strength, medium hardness | Medium strength, excellent hardness |

After the isocyanate compound is uniformly mixed, stirring is conducted until an appropriate amount of water is separated from the mixture while reducing a speed of a stirring impeller so that the produced urethane and hydraulic cement aggregate into one lump in a stirring container and phase-separated water is then removed. As a result, the plastic composition with a low water content prepared using foamable polyurethane and hydraulic cement according to the present invention is obtained. The amount of water separated and removed from the mixture may be changed depending on the amount of added water or mix ratio of other ingredients and is about 5 to 85% with respect to added water.

The obtained plastic composition is highly adhesive and flexible, but loses adhesiveness and is thus durable enough to handle and is hard enough to undergo bending and cutting processes upon primary curing of urethane after standing at room temperature for 30 to 60 minutes and is converted into a cured substance with excellent hardness and strength due to hydration of hydraulic cement particles after standing for 4 hours or more.

Hereinafter, the present invention will be described in more detail with reference to examples. The following examples are provided to describe some parts of the present invention in more detail and should be not contused as limiting the scope of the present invention.

EXAMPLE

Examples 1-5. Selection of Hydraulic Cement

Figure 1:
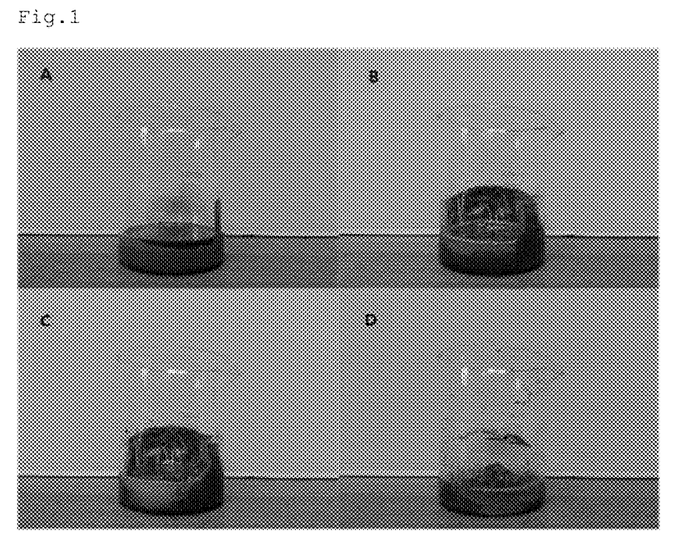
FIG. 1 is an image sequentially showing adding polymeric MDI and then stirring in Example 1 of the present invention.

Portland cement, plaster, white cement, blast furnace slag cement and quick-setting cement were added in amounts of 40 g to five 200 mL beakers as shown in the following Table 1, 16 g of water was added thereto, the ingredients were stirred for 30 seconds, 8 g of polyether polyol was further added, the resulting ingredients were stirred for 30 seconds, In addition, images were respectively obtained immediately after addition of polymeric MDI, after rapid stirring for 10 seconds, after slow stirring for 30 seconds and after slow stirring for 60 seconds in Example 1 and are shown in (A), (B), (C) and (D) of FIG. 1. As can be seen from FIG. 1, water is rapidly separated from the plastic composition via stirring.

Figure 2:
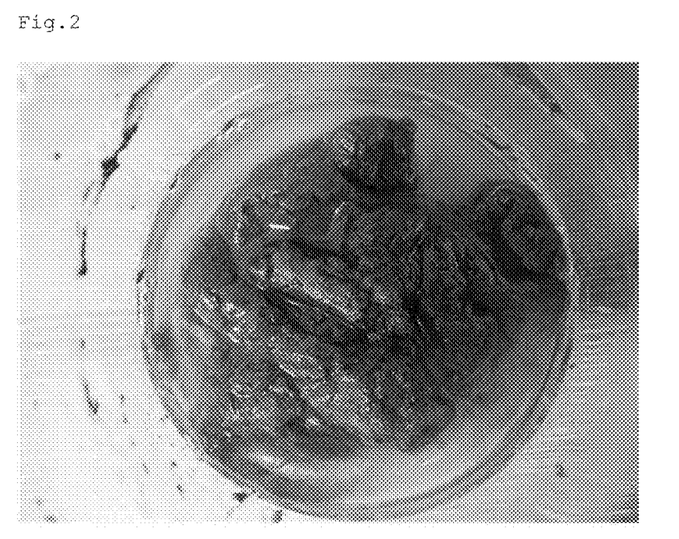
FIG. 2 is an image showing a state seen from above the beaker after slow stirring for 60 seconds in Example 1 of the present invention.
Figure 3:
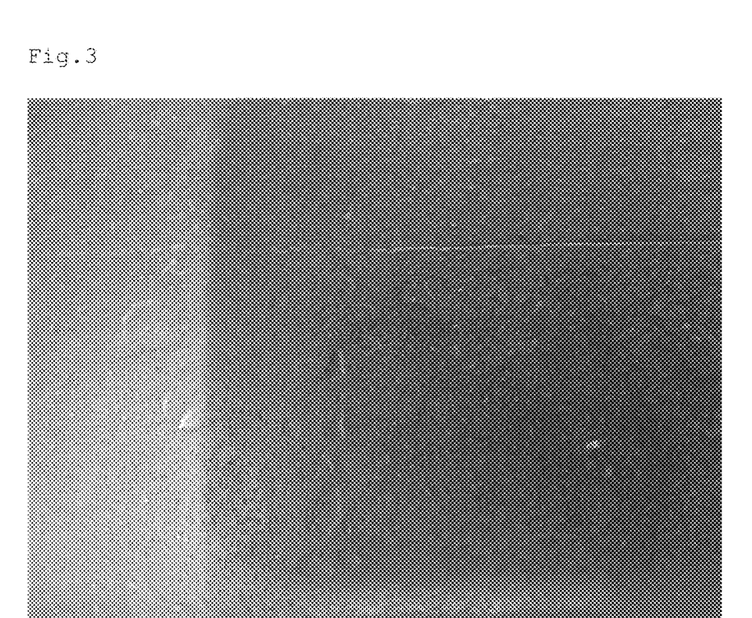
FIG. 3 is an image showing a dense surface morphology of a cured substance obtained by molding the composition obtained in Example 1 of the present invention in the form of a film using a roller and then curing.

Meanwhile, FIG. 2 is an image showing a state seen from above the beaker after slow stirring for 60 seconds in Example 1 of the present invention. FIG. 2 clearly illustrates the mix composition of polyurethane and the cement paste and liquid-type free water separated, discharged and phase-separated from the mix composition, and FIG. 3 is an image showing the dense surface of a cured substance obtained by molding the composition obtained in Example 1 of the present invention in the form of a film using a roller and then curing the film.

Figure 4:
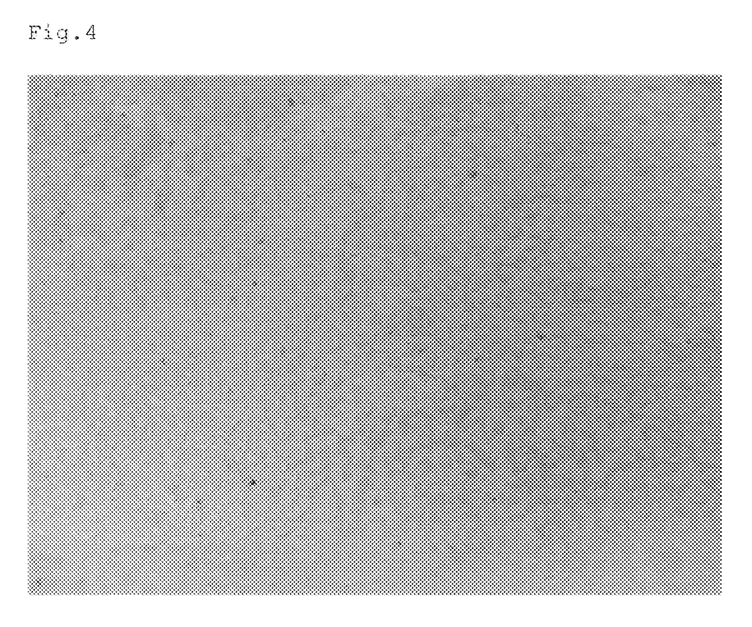
FIG. 4 is an image showing a surface morphology of a cured substance obtained by molding the composition obtained in Example 2 of the present invention in the form of a film using a roller and then curing.

In addition, FIG. 4 is an image showing the surface of a cured substance obtained by molding the composition obtained in Example 2 of the present invention in the form of a film using a roller and then curing the same. As can be seen from FIG. 4, in a case in which plaster is used instead of hydraulic cement, polyurethane is released to the surface of the cured substance due to insufficient affinity of plaster to urethane.

Figure 5:
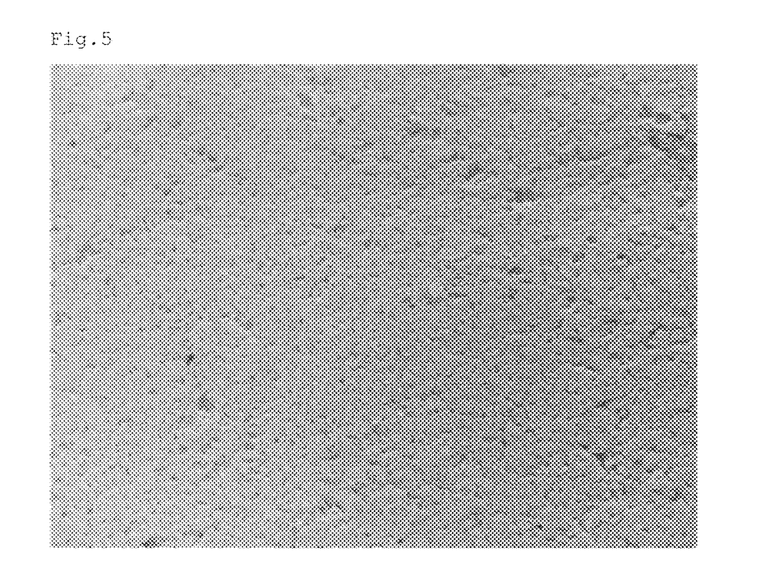
FIG. 5 is an image showing a surface morphology of a cured substance obtained by molding the composition obtained in Example 3 of the present invention in the form of a film using a roller and then curing.

FIG. 5 is an image showing the surface of a cured substance obtained by molding the composition obtained in Example 3 of the present invention in the form of a film using a roller and then curing the same. As can be seen from FIG. 5, white cement with relatively large particles does not release polyurethane due to excellent affinity to urethane.

As can be seen from Table 1 and FIGS. 1 to 5, in all cases excluding use of plaster, plastic compositions with excellent adhesive strength and plasticity are obtained, and the cured substances are excellent or medium in terms of either strength or hardness and are useful as good molding materials.

It can be seen that, thereamong, Portland cement is excellent in terms of both plastic composition properties and cured substance properties.

Examples 6-11. Application of Combination of Hydraulic Cement

Portland cement which was considered to have excellent strength and plaster or white cement which was considered to have bad strength in Examples 1 to 5 were mixed in a ratio shown in Table 2, 40 g of the mixture and 16 g of water were respectively added to 200 mL beakers and stirring was conducted for 30 seconds. 8 g of polyether polyol was added thereto, stirring was conducted for 30 seconds, 8 g of liquid polymeric MDI was added, rapid stirring was conducted for 10 seconds and slow stirring was conducted for 1 minute. Then, the discharged water was transferred to another container and weighed. The plastic composition obtained by separation of water was molded in the form of a film using a roller and cured for 24 hours and properties of the plastic composition and the cured substance were observed.

TABLE 2

| Items | | Ex. 6 | Ex. 7 | Ex. 8 | Ex. 9 | Ex. 10 | Ex. 11 |
|---|---|---|---|---|---|---|---|
| Hydraulic cement | Portland cement | 10 g | 20 g | 30 g | 10 g | 20 g | 30 g |
| | Plaster | 30 g | 20 g | 10 g | | | |
| | White cement | | | | 30 g | 20 g | 10 g |
| Water | | 16 g | 16 g | 16 g | 16 g | 16 g | 16 g |
| Polyether polyol | | 8 g | 8 g | 8 g | 8 g | 8 g | 8 g |
| MDI | | 8 g | 8 g | 8 g | 8 g | 8 g | 8 g |
| Amount of discharged water | | 3 g | 6 g | 6.4 g | 4.5 g | 8.4 g | 8.4 g |
| Properties of plastic composition | | Weak aggregation | Weak aggregation | Excellent adhesive property | Weak aggregation | Excellent adhesive property | Excellent adhesive property |
| Properties of cured substance | | Medium strength, medium hardness | Medium strength, medium hardness | Excellent strength, excellent hardness | Medium strength, medium hardness | Excellent strength, medium hardness | Excellent strength, excellent hardness |
| Release of polyurethane | | No | No | No | No | No | No |

As can be seen from results shown in Table 2, when a great amount of plaster or white cement is mixed, aggregation of the plastic composition is slightly deteriorated and, strength or hardness of the cured substance is medium, but when the content of plaster or white cement is less than 50%, a cured substance with relatively excellent physical properties can be obtained.

Examples 12-29. Determination of Suitable Ratio Between Hydraulic Cement and Ingredient for Forming Foamed Urethane 40 g of Portland cement and 16 g of water were respectively added to 200 mL beakers, the resulting mixture was stirred for 30 seconds, polyether polyol and liquid polymeric MDI were sequentially added thereto while the amounts of added polyether polyol and liquid polymeric MDI were changed as shown in Table 3, and the discharged water was transferred to another container and weighed. In addition, the resulting plastic composition was molded in the form of a film using a roller and cured for 24 hours. Then, properties of the plastic composition and the cured substance were observed.

TABLE 3

| Items | Polyether polyol | MDI | Amount of discharged water | Properties of plastic composition | Properties of cured substance |
|---|---|---|---|---|---|
| Ex. 12 | 2 g | 2 g | 1 g | Weak aggregation | Low strength, medium hardness |
| Ex. 13 | 3 g | 3 g | 3 g | Weak aggregation | Low strength, medium hardness |
| Ex. 14 | 4 g | 4 g | 4.6 g | Medium aggregation | Medium strength, excellent hardness |
| Ex. 15 | 5 g | 5 g | 8 g | Medium adhesion | Excellent strength, excellent hardness |

TABLE 3-continued

| Items | Polyether polyol | MDI | Amount of discharged water | Properties of plastic composition | Properties of cured substance |
|---|---|---|---|---|---|
| Ex. 16 | 6 g | 6 g | 12.2 g | High adhesion | Excellent strength, excellent hardness |
| Ex. 17 | 7 g | 7 g | 13 g | High adhesion | Excellent strength, medium hardness |
| Ex. 18 | 9 g | 9 g | 8.1 g | High adhesion | Excellent strength, medium hardness |
| Ex. 19 | 10 g | 10 g | 7.6 g | High adhesion | Medium strength, medium hardness |
| Ex. 20 | 11 g | 11 g | 8 g | High adhesion | Medium strength, medium hardness |
| Ex. 21 | 12 g | 12 g | 6.1 g | High adhesion | Medium strength, medium hardness |
| Ex. 22 | 13 g | 13 g | 6 g | High adhesion | Medium strength, medium hardness |
| Ex. 23 | 14 g | 14 g | 5.7 g | High adhesion | Medium strength, medium hardness |
| Ex. 24 | 15 g | 15 g | 7.5 g | High adhesion | Medium strength, medium hardness |
| Ex. 25 | 16 g | 16 g | 7 g | High adhesion | Medium strength, medium hardness |
| Ex. 26 | 17 g | 17 g | 4.6 g | High adhesion | Medium strength, low hardness |
| Ex. 27 | 18 g | 18 g | 3 g | High adhesion | Medium strength, low hardness |
| Ex. 28 | 19 g | 19 g | 3.2 g | High adhesion | Medium strength, low hardness |
| Ex. 29 | 20 g | 20 g | 2 g | High adhesion | Medium strength, low hardness |

As can be seen from Table 3, as the contents of polyol and MDI, which are ingredients for forming foamable polyurethane, increase, the adhesive strength of the plastic composition is improved, whereas, when the contents are higher than a certain levels, strength and hardness of the cured substance are deteriorated.

The mix ratio of the ingredient for forming foamable polyurethane that exhibits the best properties is determined to be 20 to 35 parts by weight, with respect to 100 parts by weight of the hydraulic cement.

Examples 30-34. Use of Polyester-Based Polyol as Ingredient for Forming Foamed Urethane 40 g of Portland cement and 16 g of water were respectively added to 200 mL beakers, the resulting mixture was stirred for 30 seconds, polyester polyol and liquid polymeric MDI were sequentially added thereto in amounts as shown in Table 4, and the discharged water was transferred to another container and weighed. In addition, the resulting plastic composition was molded in the form of a film using a roller and cured for 24 hours. Then, properties of the plastic composition and the cured substance were observed.

TABLE 4

| Items | Ex. 30 | Ex. 31 | Ex. 32 | Ex. 33 | Ex. 34 |
|---|---|---|---|---|---|
| Portland cement | 40 g | 40 g | 40 g | 40 g | 40 g |
| Water | 16 g | 16 g | 16 g | 16 g | 16 g |
| Polyether polyol | 2 g | 3 g | 4 g | 5 g | 6 g |
| MDI | 2 g | 3 g | 4 g | 5 g | 6 g |
| Amount of discharged water | 0 g | 2 g | 5 g | 10.8 g | 12.2 g |
| Properties of plastic composition | No aggregation | Low aggregation | Medium aggregation | Excellent adhesive property | Excellent adhesive property |
| Properties of cured substance | Low strength, low hardness | Low strength, low hardness | Low strength, medium hardness | Excellent strength, excellent hardness | Excellent strength, excellent hardness |

In a case in which polyester-based polyol is used, like a case in which polyether polyol is used, a plastic composition with excellent adhesive strength and a cured substance with excellent physical properties can be obtained.

Examples 35-39. Review of Suitable Amount of Added Water 40 g of Portland cement was added to a 200 mL beaker, water and polyether polyol were added together thereto while changing the amount of added water as shown in Table 5, and stirring was conducted for 30 seconds. Then, 7 g of polymeric MDI was added and mixing properties were observed while mixing. Then, the discharged water was transferred to another container and weighed. In addition, the plastic composition obtained by separation of water was molded in the form of a film using a roller and cured for 24 hours. Then, properties of the plastic composition were observed.

As can be seen from Table 5, as the amount of added water increases, workability is good due to improved flowability, but adhesive property of the plastic composition or physical properties of the cured substance may be deteriorated, when the amount of added water is excessively high. The amount of added water as well as the amount of added ingredient for forming foamable polyurethane should be controlled depending on desired application.

Examples 40-45. Preparation of Composite Molded Substance 40 g of Portland cement and 16 g of water were respectively added to 200 mL beakers, the resulting mixture was stirred for 30 seconds, polyether polyol and liquid polymeric MDI were sequentially added thereto while the amounts of added polyether polyol and liquid polymeric MDI were changed as shown in Table 6, and the discharged water was transferred to another container and weighed. In addition,

TABLE 5

| Items | Ex. 35 | Ex. 36 | Ex. 37 | Ex. 38 | Ex. 39 |
|---|---|---|---|---|---|
| Portland cement | 40 g | 40 g | 40 g | 40 g | 40 g |
| Water | 1 g | 2 g | 5 g | 30 g | 40 g |
| Polyether polyol | 7 g | 7 g | 7 g | 7 g | 7 g |
| MDI | 7 g | 7 g | 7 g | 7 g | 7 g |
| Amount of discharged water | 0 g | 0.8 g | 1.5 g | 19.3 g | 12.2 g |
| Properties of mixing | Bad workability | Bad workability | Bad workability | Good workability | Good workability |
| Properties of plastic composition | Foamed | Excellent adhesive property | Excellent adhesive property | Low aggregation | Impossible aggregation |
| Properties of cured substance | Medium strength, medium hardness | Medium strength, medium hardness | High strength, high hardness | Medium strength, medium hardness | — | wood fiber, pulp, dry sand, ground waste paper, bran, aluminum hydroxide and glass fiber powder were added to the plastic composition obtained after separation of water, the ingredients were mixed and were molded in a die and cured for hours. Then, properties of the cured substance were observed.

TABLE 6

| Items | Ex. 40 | Ex. 41 | Ex. 42 | Ex. 43 | Ex. 44 | Ex. 45 |
|---|---|---|---|---|---|---|
| Portland cement | 40 g | 40 g | 40 g | 40 g | 40 g | 40 g |
| Water | 16 g | 16 g | 16 g | 16 g | 16 g | 16 g |
| Polyether polyol | 14 g | 6 g | 6 g | 14 g | 7 g | 7 g |
| MDI | 14 g | 6 g | 6 g | 14 g | 7 g | 7 g |
| Amount of discharged water | 6 g | 11.4 g | 10.5 g | 3.8 g | 10.1 g | 9.5 g |
| Mixed substance (amount) | Wood fiber (20 g) | Pulp (0.77 g) | Ground waste paper (1.2 g) | Bran (10 g) | Aluminum hydroxide (10 g) | Glass fiber powder (0.2 g) |
| Properties of cured substance | Excellent durability | Improved strength | Surface roughness | Surface roughness | Low abrasion resistance | Improved strength |

As can be seen from Table 6, composite molded articles with various properties as well as a variety of fillers can be produced using the plastic composition according to the present invention.

Figure 6:
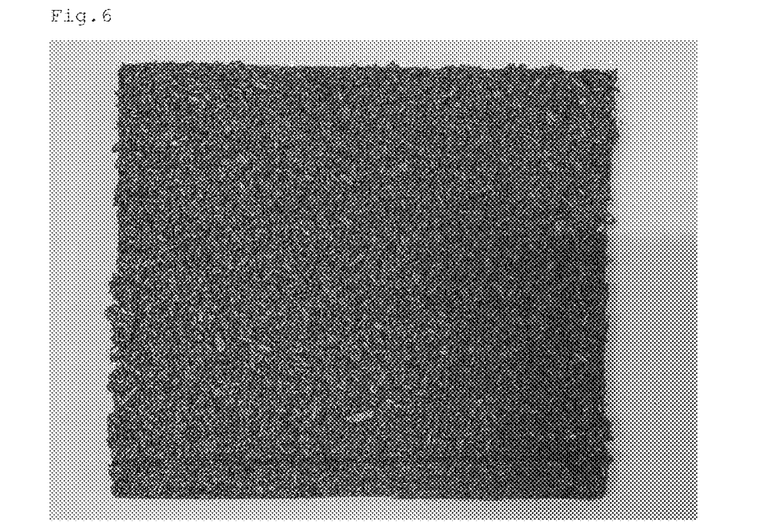
FIG. 6 is an image showing a surface morphology of a composite molded article using wood fibers obtained in Example 40 of the present invention.

Meanwhile, FIG. 6 is an image showing a surface morphology of a composite molded article using a wood fiber obtained in Example 40 of the present invention.

Although the preferred embodiments of the present invention have been disclosed for illustrative purposes, those skilled in the art will appropriate that various modifications, additions and substitutions are possible, without departing from the scope and spirit of the invention as disclosed in the accompanying claims.

The invention claimed is:

1. A method for manufacturing a plastic composition with a low water content comprising hydraulic cement comprising:

mixing hydraulic cement, water, and polyol and isocyanate compound, as ingredients for forming foamable polyurethane to obtain a flowable homogeneous mixture;

polymerizing the flowable homogeneous mixture to discharge free water present between cement particles based on foaming force and thereby phase-separate liquid water from a plastic composition containing the foamable polyurethane and hydraulic cement and losing flowability; and removing the phase-separated water to obtain the plastic composition, wherein water and polyol are mixed with the hydraulic cement before the isocyanate compound is mixed with the hydraulic cement.

2. The method for manufacturing a plastic composition with a low water content comprising hydraulic cement according to claim 1, wherein the hydraulic cement comprises any one selected from Portland cement, blast furnace slag cement, pozzolan cement, expansive cement, quick-setting/rapid-hardening cement, oil-well cement, white cement, colored cement and calcium aluminate cement, or a mixture thereof, or a mixture of any one selected from these cements and plaster.

3. The method for manufacturing a plastic composition with a low water content comprising hydraulic cement according to claim 1, wherein the homogeneous mixture comprises 2.5 parts by weight to 150 parts by weight of water and 10 parts by weight to 100 parts by weight of the ingredients for forming foamable polyurethane, with respect to 100 parts by weight of the hydraulic cement.

* * * * *